US011348360B2

(12) United States Patent
Wang et al.

(10) Patent No.: US 11,348,360 B2
(45) Date of Patent: May 31, 2022

(54) METHOD FOR BIOMETRIC IDENTIFICATION, FINGERPRINT IDENTIFICATION APPARATUS AND ELECTRONIC DEVICE (71) Applicant: SHENZHEN GOODIX TECHNOLOGY CO., LTD., Shenzhen (CN)

(72) Inventors: Bingwen Wang, Shenzhen (CN); Shunzhan Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/134,140

(22) Filed: Dec. 24, 2020

(65) Prior Publication Data
US 2021/0150178 A1 May 20, 2021

Related U.S. Application Data (63) Continuation of application No. PCT/CN2019/088028, filed on May 22, 2019.

(51) Int. Cl.
G06K 9/20 (2006.01)
G06V 40/13 (2022.01)
G06V 10/143 (2022.01)
G06V 40/40 (2022.01)
G06V 40/70 (2022.01)
(Continued)

(52) U.S. Cl.
CPC ........ *G06V 40/1318* (2022.01); *G06V 10/143* (2022.01); *G06V 40/1347* (2022.01); *G06V 40/45* (2022.01); *G06V 40/70* (2022.01); *G06V 40/15* (2022.01)

(58) Field of Classification Search
CPC ........... G06K 9/00006–9/0012; G06K 9/0004; G06K 9/00906; G06K 2009/00939
See application file for complete search history.

(56) References Cited

U.S. PATENT DOCUMENTS 8,570,149 B2 10/2013 Rowe et al.
9,007,175 B2 4/2015 Rowe et al.
(Continued)

FOREIGN PATENT DOCUMENTS

CN 105279504 A 1/2016
CN 107223251 A * 9/2017 ............ A61B 5/024
(Continued)

*Primary Examiner* — Brian Werner (57) ABSTRACT

A method for biometric identification includes: acquiring a first fingerprint image by using a first image capturing mode, where the first fingerprint image is used for first biometric identification, and the first biometric identification includes fingerprint identification; and acquiring a plurality of frames of second fingerprint images by using a second image capturing mode, where the plurality of frames of second fingerprint images are used for second biometric identification, and the second biometric identification includes at least one of heart rate detection, blood oxygen detection or living body detection, and the first image capturing mode is different from the second image capturing mode. The method for biometric identification is beneficial to improve detection performance.

18 Claims, 7 Drawing Sheets (51) Int. Cl.
     *G06V 40/12*         (2022.01)
     *G06V 40/10*         (2022.01)

(56) References Cited

U.S. PATENT DOCUMENTS

| | | |
|---|---|---|
| 2012/0062364 A1 | 3/2012 | Rowe et al. |
| 2014/0292484 A1 | 10/2014 | Rowe et al. |
| 2017/0032169 A1* | 2/2017 | Pi .................. G06K 9/00026 |
| 2018/0046281 A1 | 2/2018 | Pi |
| 2018/0173343 A1 | 6/2018 | Pi |
| 2018/0322328 A1* | 11/2018 | Pang .................. A61B 5/117 |
| 2019/0065717 A1 | 2/2019 | Won |

FOREIGN PATENT DOCUMENTS

| | | |
|---|---|---|
| CN | 107223251 A | 9/2017 |
| CN | 109196522 A | 1/2019 |
| CN | 110383286 A | 10/2019 |
| EP | 3447685 A1 | 2/2019 |
| WO | 2016205832 A1 | 12/2016 |
| WO | 2018049944 A1 | 3/2018 |
| WO | 2018236280 A1 | 12/2018 |

\* cited by examiner

METHOD FOR BIOMETRIC IDENTIFICATION, FINGERPRINT IDENTIFICATION APPARATUS AND ELECTRONIC DEVICE

CROSS-REFERENCE TO RELATED APPLICATIONS

This application is a continuation of International Application No. PCT/CN2019/088028, filed on May 22, 2019, the disclosure of which is hereby incorporated by reference in its entirety.

TECHNICAL FIELD

Embodiments of the present application relate to the field of biometric identification, and in particular, to a method for biometric identification, a fingerprint identification apparatus and an electronic device.

BACKGROUND

As a buzzword in an intelligent terminal, "a full screen" is increasingly accepted and loved by users, and under-screen fingerprint identification has become a trend, which is gradually popularized in the intelligent terminal. The under-screen fingerprint identification is based on optical system imaging, which makes it possible to achieve more other functions besides acquiring a fingerprint signal, such as heart rate detection, living body detection, blood oxygen detection, or the like.

How to achieve other function detection based on the under-screen fingerprint identification apparatus is a problem worthy of study.

SUMMARY

In view of this, embodiments of the present application provide a method for biometric identification, a fingerprint identification apparatus, and an electronic device, which could achieve other function detection by using the fingerprint identification apparatus and is beneficial to improve detection performance.

In a first aspect, a method for biometric identification is provided, the method is applied to a fingerprint identification apparatus, the fingerprint identification apparatus is disposed under a display screen, and the method includes: acquiring a first fingerprint image by using a first image capturing mode, where the first fingerprint image is used for first biometric identification, and the first biometric identification includes fingerprint identification; and acquiring a plurality of frames of second fingerprint images by using a second image capturing mode, where the plurality of frames of second fingerprint images are used for second biometric identification, and the second biometric identification includes at least one of heart rate detection, blood oxygen detection or living body detection, and the first image capturing mode is different from the second image capturing mode.

An image capturing mode may refer to various software settings in the entire process from light emission to data processing of a captured fingerprint image. According to the method for biometric identification of an embodiment of the present application, detection of other functions such as heart rate and blood oxygen may be achieved without additional hardware cost. Furthermore, the fingerprint identification apparatus may use different image capturing modes (different software settings) to perform different function detection, so that a better image capturing mode may be used for a certain function detection, which is beneficial to improve detection performance.

In one possible implementation manner, the acquiring the plurality of frames of second fingerprint images by using the second image capturing mode includes: continuously capturing a plurality of frames of original fingerprint images; and compressing the plurality of frames of original fingerprint images to obtain the plurality of frames of second fingerprint images.

In the second image capturing mode, since a plurality of frames of fingerprint images are captured, the acquired data amount is relatively large, and it requires a relatively long time to transmit the data to the processor. The function detection such as heart rate detection, blood oxygen detection or living body detection is achieved by extracting photo plethysmography (photo plethysmography, PPG) signal amount calculated in the plurality of frames of fingerprint images captured within a certain time. Therefore, the fingerprint image only needs to reflect a certain amount of data, the plurality of frames of fingerprint images captured may be compressed and then transmitted, and thus the transmission time may be reduced.

In one possible implementation manner, the compressing the plurality of frames of original fingerprint images to obtain the plurality of frames of second fingerprint images includes: dividing each frame of fingerprint image in the plurality of frames of original fingerprint images into a plurality of sub-regions; and processing a plurality pieces of pixel data included in each sub-region of the plurality of sub-regions into one piece of data to obtain the plurality of frames of second fingerprint images.

In one possible implementation manner, the processing the plurality pieces of pixel data included in each sub-region of the plurality of sub-regions into one piece of data includes: performing summation processing or average processing on the plurality pieces of pixel data included in each sub-region.

In one possible implementation manner, a light signal emitted by the display screen is used to acquire the first fingerprint image and the plurality of frames of second fingerprint images, and the acquiring the first fingerprint image by using the first image capturing mode includes: acquiring the first fingerprint image in a first light-emitting mode of the display screen; and the acquiring the plurality of frames of second fingerprint images by using the second image capturing mode includes: acquiring the plurality of frames of second fingerprint images in a second light-emitting mode of the display screen, where an intensity of a light signal in the first light-emitting mode is greater than an intensity of a light signal in the second light-emitting mode.

When fingerprint identification is performed, in order to achieve a shorter exposure time length, an intensity of light emitted by a screen needs to be relatively large, however high brightness in a long time may affect the life of the screen. Further, since the function detection such as heart rate detection, blood oxygen detection or living body detection needs to capture the plurality of frames of fingerprint images and the demand for brightness is not high, an intensity of light emitted by the screen may be appropriately reduced when performing other function detection.

In one possible implementation manner, the first light-emitting mode is a high brightness mode (HBM), and the second light-emitting mode is a non-HBM.

Optionally, the brightness in a high brightness mode may be regarded to be higher than 450 nits (nit), while the brightness in a non-high brightness mode may be regarded to be lower than 450 nits.

Optionally, the brightness in the high brightness mode may be regarded to be higher than 1000 lux (lux), and the brightness in the non-high brightness mode may be regarded to be lower than 600 lux.

In one possible implementation manner, the acquiring the plurality of frames of second fingerprint images in the second light-emitting mode of the display screen includes: in the second light-emitting mode, acquiring the plurality of frames of second fingerprint images by using a target exposure time length, where the target exposure time length is greater than a preset exposure time length in the second light-emitting mode.

Since intensities are different for different signals of a finger, an exposure time length may be adaptively compensated when performing other function detection, so as to achieve the optimal heart rate detection, living body detection or blood oxygen detection.

In one possible implementation manner, the plurality of frames of second fingerprint images include a plurality of frames of third fingerprint images and a plurality of frames of fourth fingerprint images, and the acquiring the plurality of frames of second fingerprint images by using the second image capturing mode includes: acquiring the plurality of frames of third fingerprint images by using a light signal with a first wavelength; and acquiring the plurality of frames of fourth fingerprint images by using a light signal with a second wavelength, where difference between a light signal of the plurality of frames of third fingerprint images and a light signal of the plurality of frames of fourth fingerprint images is used for blood oxygen detection.

In one possible implementation manner, the first wavelength is a visible light wavelength, and the second wavelength is an infrared light wavelength.

In one possible implementation manner, the acquiring the first fingerprint image by using the first image capturing mode includes: acquiring the first fingerprint image by using a first sampling rate; and the acquiring the plurality of frames of second fingerprint images by using the second image capturing mode includes: acquiring the plurality of frames of second fingerprint images by using a second sampling rate, where the second sampling rate is greater than the first sampling rate.

The needs of other function detection may be met by using a large sampling rate. For example, at a certain sampling rate, a more detailed heart rate signal such as a pacing wave may be seen.

In one possible implementation manner, the second sampling rate is greater than or equal to 4 Hz.

Preferably, the second sampling rate is 20 Hz.

In a second aspect, a fingerprint identification apparatus is provided, the fingerprint identification apparatus is disposed under a display screen, and the fingerprint identification apparatus includes: a fingerprint sensor configured to acquire a first fingerprint image by using a first image capturing mode, where the first fingerprint image is used for first biometric identification, and the first biometric identification includes fingerprint identification; where the fingerprint sensor is further configured to: acquire a plurality of frames of second fingerprint images by using a second image capturing mode, where the plurality of frames of second fingerprint images are used for second biometric identification, and the second biometric identification includes at least one of heart rate detection, blood oxygen detection or living body detection, and the first image capturing mode is different from the second image capturing mode.

In one possible implementation manner, the fingerprint sensor is configured to: continuously capture a plurality of frames of original fingerprint images; and compress the plurality of frames of original fingerprint images to obtain the plurality of frames of second fingerprint images.

In one possible implementation manner, the fingerprint sensor is configured to: divide each frame of fingerprint image in the plurality of frames of original fingerprint images into a plurality of sub-regions; and process a plurality pieces of pixel data included in each sub-region of the plurality of sub-regions into one piece of data to obtain the plurality of frames of second fingerprint images.

In one possible implementation manner, the fingerprint sensor is configured to: perform summation processing or average processing on the plurality pieces of pixel data included in each sub-region.

In one possible implementation manner, a light signal emitted by the display screen is used to acquire the first fingerprint image and the plurality of frames of second fingerprint images, and the fingerprint sensor is configured to: acquire the first fingerprint image in a first light-emitting mode of the display screen; and acquire the plurality of frames of second fingerprint images in a second light-emitting mode of the display screen, where an intensity of a light signal in the first light-emitting mode is greater than an intensity of a light signal in the second light-emitting mode.

In one possible implementation manner, the first light-emitting mode is a high brightness mode, and the second light-emitting mode is a non-high brightness mode.

In one possible implementation manner, the fingerprint sensor is configured to: in the second light-emitting mode, acquire the plurality of frames of second fingerprint images by using a target exposure time length, where the target exposure time length is greater than a preset exposure time length in the second light-emitting mode.

In one possible implementation manner, the plurality of frames of second fingerprint images include a plurality of frames of third fingerprint images and a plurality of frames of fourth fingerprint images, the display screen is configured to emit a light signal with a first wavelength, and the fingerprint identification apparatus further includes: an external light source configured to emit a light signal with a second wavelength, where the first wavelength is different from the second wavelength; and the fingerprint sensor is configured to: acquire the plurality of frames of third fingerprint images by using the light signal with the first wavelength; and acquire the plurality of frames of fourth fingerprint images by using the light signal with the second wavelength, where difference between a light signal of the plurality of frames of third fingerprint images and a light signal of the plurality of frames of fourth fingerprint images is used for blood oxygen detection.

In one possible implementation manner, the first wavelength is a visible light wavelength, and the second wavelength is an infrared light wavelength.

In one possible implementation manner, the fingerprint sensor is configured to: acquire the first fingerprint image by using a first sampling rate; and acquire the plurality of frames of second fingerprint images by using a second sampling rate, where the second sampling rate is greater than the first sampling rate.

In one possible implementation manner, the second sampling rate is greater than or equal to 4 Hz.

In a third aspect, an electronic device is provided, which includes a display screen and the fingerprint identification apparatus according to the second aspect or any one of possible implementation manners of the second aspect.

In one possible implementation manner, the electronic device includes an external light source and/or the display screen emits light by itself.

In one possible implementation manner, a wavelength of a light signal emitted by the display screen is different from a wavelength of a light signal emitted by the external light source.

These and other aspects of the present application will be clearer and easier to understand from the following description of the embodiments.

DESCRIPTION OF EMBODIMENTS

In order to make those skilled in the art better understand technical solutions in embodiments of the present application, a clear and complete description of the technical solutions in the embodiments of the present application will be given below, in combination with the accompanying drawings in the embodiments of the present application. Apparently, the described embodiments are merely some but not all of the embodiments of the present application. All of other embodiments, obtained by those skilled in the art based on the embodiments of the present application, shall fall into the protection scope of the embodiments of the present application.

As a common application scenario, a terminal device has a fingerprint identification apparatus, in the foregoing terminal device, a fingerprint identification apparatus may be specifically an optical fingerprint apparatus, which may be disposed in a partial region or an entire region under a display screen, thereby forming an under-screen (Under-display) optical fingerprint system. Alternatively, the fingerprint identification apparatus may be partially or entirely integrated into the interior of the display screen of the terminal device to form an in-screen (In-display) optical fingerprint system. It should be understood that embodiments of the present application are only described by taking the optical fingerprint apparatus as an example, which should not constitute any limitation to the embodiments of the present application, and the embodiments of the present application are also applicable to other systems using an optical imaging technology or the like.

Figure 1:
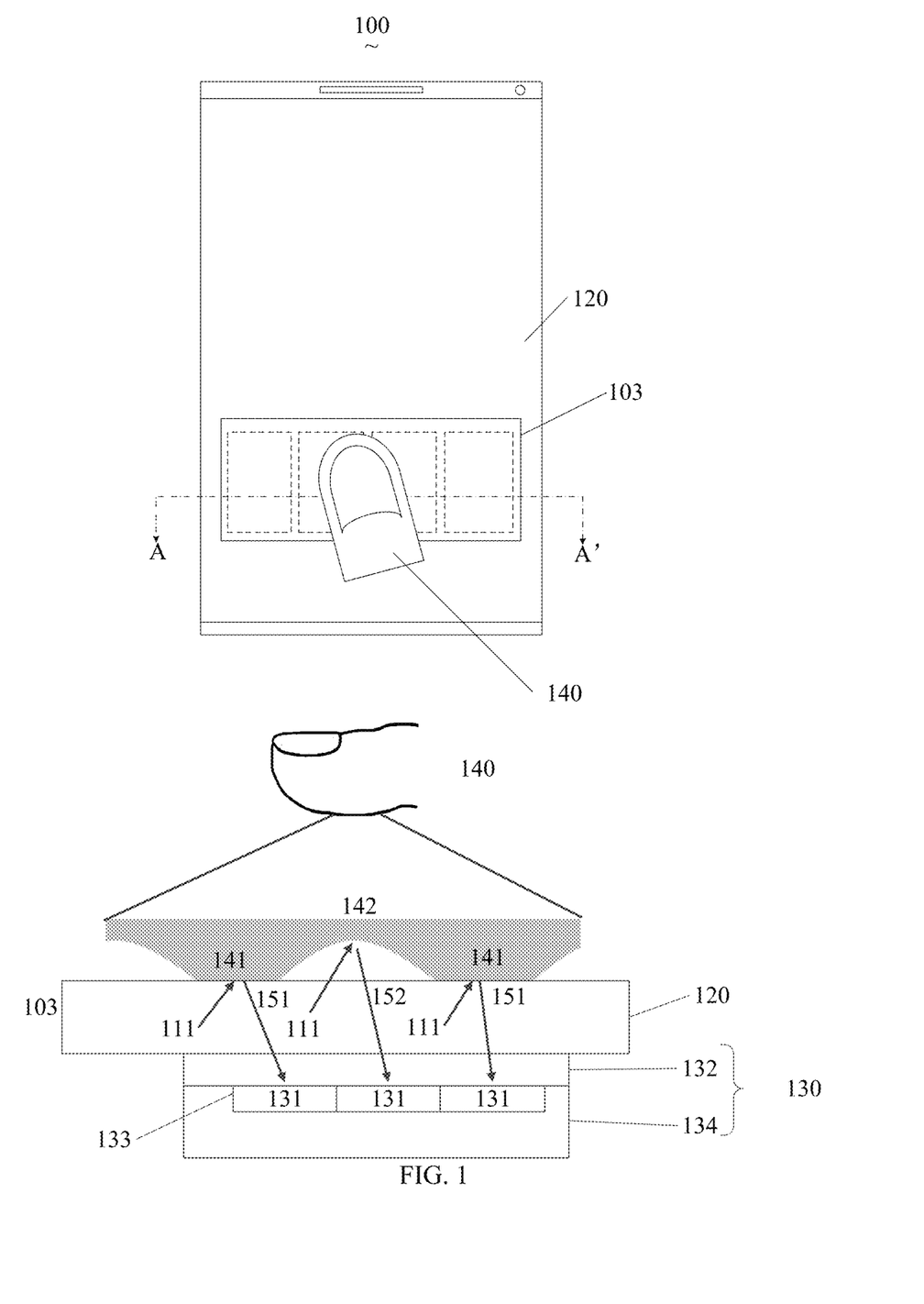
FIG. 1 shows a schematic block diagram of an application scenario of an embodiment of the present application.

FIG. 1 is a schematic structural diagram of a terminal device applicable to an embodiment of the present application. A terminal device 100 includes a display screen 120 and an optical fingerprint apparatus 130, where the optical fingerprint apparatus 130 is disposed in a partial region under the display screen 120. The optical fingerprint apparatus 130 includes an optical fingerprint sensor including a sensing array 133 having a plurality of optical sensing units 131, and a region where the sensing array is located or its sensing region is a fingerprint identification region 103 of the optical fingerprint apparatus 130. As shown in FIG. 1, the fingerprint identification region 103 is located in a display region of the display screen 120. In an alternative embodiment, the optical fingerprint apparatus 130 may also be disposed at other positions, such as a side of the display screen 120 or an edge non-light transmitting region of the terminal device 100, and a light signal of at least part of the display region of the display screen 120 is directed to the optical fingerprint apparatus 130 through light path design, such that the fingerprint identification region 103 is actually located in the display region of the display screen 120.

It should be understood that an area of the fingerprint identification region 103 may be different from an area of the sensing array of the optical fingerprint apparatus 130. For example, the area of the fingerprint identification region 103 of the optical fingerprint apparatus 130 may be larger than the area of the sensing array of the optical fingerprint apparatus 130 through light path design such as lens imaging, reflective folding light path design or other light path design such as light convergence or reflection. In other alternative implementation manners, if the light path is directed in a manner of, for example, light collimation, the area of the fingerprint identification region 103 of the optical fingerprint apparatus 130 may also be designed to be substantially identical with the area of the sensing array of the optical fingerprint apparatus 130.

Therefore, when a user needs to unlock the terminal device or perform other fingerprint verification, a fingerprint input may be implemented merely by pressing a finger against the fingerprint identification region 103 located on the display screen 120. Since fingerprint detection may be implemented in the display, there is no need to exclusively reserve space for a front surface of the terminal device 100 adopting the foregoing structure to set a fingerprint button (such as a Home button), so that a full screen solution may be adopted; that is, the display region of the display screen 120 may be substantially extended to an entire front surface of the terminal device 100.

As an alternative implementation manner, as shown in FIG. 1, the optical fingerprint apparatus 130 includes a light detection portion 134 and an optical assembly 132. The light detection portion 134 includes the sensing array, a readout circuit and other auxiliary circuits electrically connected to the sensing array, which is fabricated in a die by a semiconductor process such as an optical imaging chip or an optical fingerprint sensor; and the sensing array is specifically a photo detector array including a plurality of photo detectors distributed in an array, and the photo detectors may be used as the optical sensing unit as described above. The optical assembly 132 may be disposed above the sensing array of the light detection portion 134, and may specifically include a filter layer, a light directing layer or a light path directing structure, and other optical elements, the filter layer may be used to filter out ambient light passing through a finger, and the light directing layer or light path directing structure is mainly used to direct reflected light reflected from a finger surface to the sensing array for optical detection.

In a specific implementation, the optical assembly 132 and the light detection portion 134 may be encapsulated in the same optical fingerprint component. For example, the optical assembly 132 and the light detection portion 134 may be encapsulated in the same optical fingerprint chip, or the optical assembly 132 may be disposed outside a chip where the light detection portion 134 is located, for example, the optical assembly 132 is attached above the chip, or a part of elements of the optical assembly 132 are integrated into the chip.

The light directing layer or light path directing structure of the optical assembly 132 has various implementations, for example, the light directing layer may be specifically a collimator layer made of a semiconductor silicon wafer, which has a plurality of collimating units or micro-pore arrays, and the collimating units may be a small hole. Light beam that is in the reflected light reflected from the finger and is vertically incident to the collimating unit may pass through the hole and be received by the optical sensing unit below it. However, light beam with an excessive incident angle is attenuated through multiple reflections inside the collimating unit, therefore, each optical sensing unit may substantively only receive the reflected light reflected from the fingerprint directly above the optical sensing unit, and thus the sensing array may detect a fingerprint image of the finger.

In another embodiment, the light directing layer or the light path directing structure may also be an optical lens layer having one or more lens units, such as a lens group composed of one or more aspheric lenses, for converging reflected light reflected from a finger to the sensing array of the light detection portion 134 below it, so that the sensing array may perform imaging based on the reflected light to obtain the fingerprint image of the finger. Optionally, an optical lens layer may be provided with a pinhole in the light path of the lens unit, and the pinhole may cooperate with the optical lens layer to expand the field of view of the optical fingerprint apparatus, to improve a fingerprint imaging effect of the optical fingerprint apparatus 130.

In other embodiments, the light directing layer or the light path directing structure may also specifically adopt a micro-lens layer having a micro-lens array formed by a plurality of micro-lenses, which may be formed above the sensing array of the light detection portion 134 by a semiconductor growth process or other processes, and each micro-lens may correspond to one of the sensing units of the sensing array respectively. Furthermore, other optical film layers such as a dielectric layer or a passivation layer, may be formed between the micro-lens layer and the sensing unit, and more specifically, a light shielding layer having a micro-pore may also be formed between the micro-lens layer and the sensing unit, where the micro-pore is formed between the corresponding micro-lens and the sensing unit, and the light shielding layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging. It should be understood that several implementations of the forgoing light path directing structure may be used alone or in combination, for example, a micro-lens layer may be further disposed under the collimator layer or the optical lens layer. Certainly, when the collimator layer or the optical lens layer is used in combination with the micro-lens layer, the specific laminated structure or light path may need to be adjusted according to actual needs.

As an optional embodiment, the display screen 120 may adopt a display screen with a self-emitting display unit, such as an organic light-emitting diode (OLED) display screen or a micro-LED (Micro-LED) display screen. Taking an OLED display screen as an example, the optical fingerprint apparatus 130 may use a display unit (that is, an OLED light source) located at the fingerprint identification region 103 of the OLED display screen 120 as an excitation light source for optical fingerprint detection. When a finger 140 is pressed against the fingerprint identification region 103, the display screen 120 emits a beam of light 111 to a target finger 140 above the fingerprint identification region 103, and the light 111 is reflected by a surface of the finger 140 to form reflected light or form scattered light after scattering inside the finger 140. In related patent applications, the reflected light and the scattered light are referred to as reflected light for convenience of description. Since a ridge 141 and a valley 142 of a fingerprint have different light reflecting abilities, reflected light 151 from the ridge of the fingerprint and reflected light 152 from the valley of the fingerprint have different light intensities; after passing through the optical assembly 132, the reflected light is received by the sensing array 134 in the optical fingerprint apparatus 130 and converted into a corresponding electrical signal, that is, a fingerprint detection signal; and fingerprint image data may be obtained based on the fingerprint detection signal, and fingerprint matching verification may be further performed, thereby implementing an optical fingerprint identification function at the terminal device 100.

In other embodiments, the optical fingerprint apparatus 130 may also use a built-in light source or an external light source to provide a light signal for fingerprint detection. In this case, the optical fingerprint apparatus 130 may be applied to a non-self-light-emitting display screen, such as a liquid crystal display screen or other passive light-emitting display screens. Taking a liquid crystal display screen having a backlight module and a liquid crystal panel as an example, in order to support under-display fingerprint detection of the liquid crystal display screen, the optical fingerprint system of the terminal device 100 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the terminal device 100. The optical fingerprint apparatus 130 may be disposed under the liquid crystal panel or the edge region of the protective cover, and light for fingerprint detection may reach the optical fingerprint apparatus 130 by being directed by a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a hole on film layers such as a diffusion sheet, a brightening sheet, a reflection sheet or the like, or by performing other optical designs.

When the optical fingerprint apparatus 130 uses a built-in light source or an external light source to provide a light signal for fingerprint detection, a detection principle is consistent with the foregoing description.

It should be understood that, in a specific implementation, the terminal device 100 further includes a transparent protective cover; the cover may be a glass cover or a sapphire cover, which is located above the display screen 120 and covers a front surface of the terminal device 100. Therefore, in an embodiment of the present application, the so-called the finger being pressed against the display screen 120 actually refers to the finger being pressed against the cover above the display screen 120 or a surface of the protective layer covering the cover.

On the other hand, in some embodiments, the optical fingerprint apparatus 130 may only include one optical fingerprint sensor, and in this case, the fingerprint identification region 103 of the optical fingerprint apparatus 130 has a smaller area and a fixed position, and therefore, the user needs to press the finger at a specific position of the fingerprint identification region 103 when a fingerprint input is performed, otherwise the optical fingerprint apparatus 130 may not be able to capture the fingerprint image, thereby resulting in poor user experience. In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively constitute the fingerprint identification region 103 of the optical fingerprint apparatus 130. In other words, the fingerprint identification region 103 of the optical fingerprint apparatus 130 may include a plurality of sub-regions, each sub-region corresponding to a sensing region of one of the optical fingerprint sensors, so that the fingerprint identification region 103 of the optical fingerprint apparatus 130 may be extended to a main region of a lower portion of the display screen, that is, it is extended to a generally pressed region by the finger, thereby achieving a blind pressing type of a fingerprint input operation. Alternatively, when the number of the optical fingerprint sensors is sufficient, the fingerprint identification region 103 may also be extended to half of the display region or even the entire display region, thereby achieving half-screen or full-screen fingerprint detection. As shown in FIG. 1, the fingerprint identification region is formed by splicing fingerprint detection sub-regions of the plurality of optical fingerprint sensors, such as 1*4, 2*2, or 2*3. Taking 1*4 as an example, it is equivalent to splicing fingerprint detection sub-regions of four optical fingerprint sensors themselves into a large-area fingerprint identification region 103.

Figure 2:
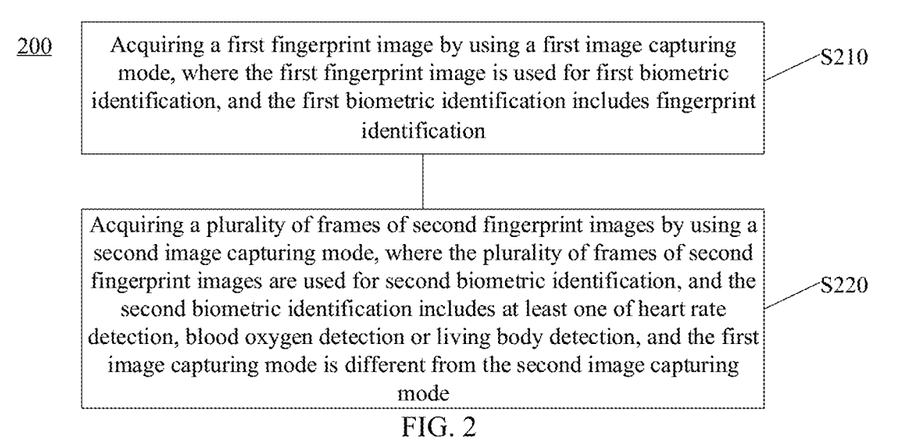
FIG. 2 shows a schematic block diagram of a method for biometric identification according to an embodiment of the present application.

FIG. 2 shows a schematic block diagram of a method 200 for biometric identification according to an embodiment of the present application. As shown in FIG. 2, the method 200 may be applied to a terminal device having a fingerprint identification apparatus, the fingerprint identification apparatus is disposed under a display screen, and the terminal device may adopt the structure shown in FIG. 1. Specifically, the method 200 may include some or all of the following contents:

S210, acquiring a first fingerprint image by using a first image capturing mode, where the first fingerprint image is used for first biometric identification, and the first biometric identification includes fingerprint identification; and S220, acquiring a plurality of frames of second fingerprint images by using a second image capturing mode, where the plurality of frames of second fingerprint images are used for second biometric identification, and the second biometric identification includes at least one of heart rate detection, blood oxygen detection or living body detection, and the first image capturing mode is different from the second image capturing mode.

First, it is necessary to introduce principles of heart rate detection, living body detection, and blood oxygen detection one by one.

Figure 3:
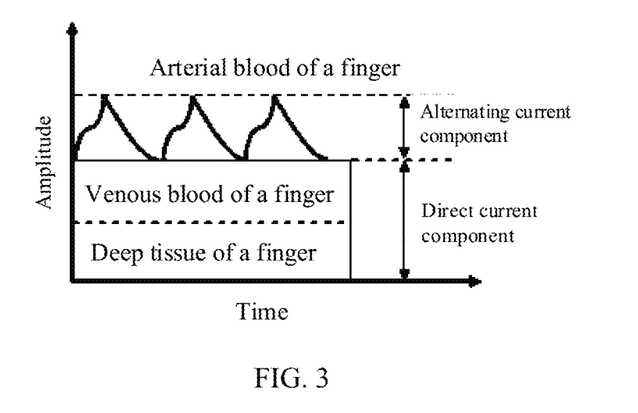
FIG. 3 is a schematic diagram of an amplitude-time diagram of the conversion of a light signal of a finger into an electrical signal thereof.
Figure 4:
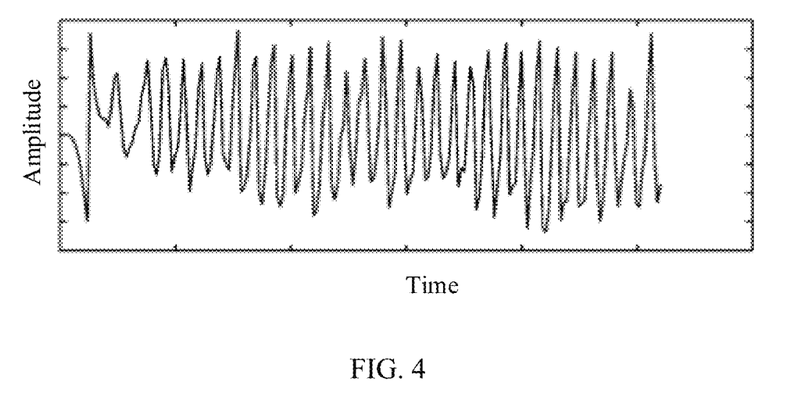
FIG. 4 shows an optical fingerprint extraction PPG signal diagram reflecting heart rate information.
Figure 5:
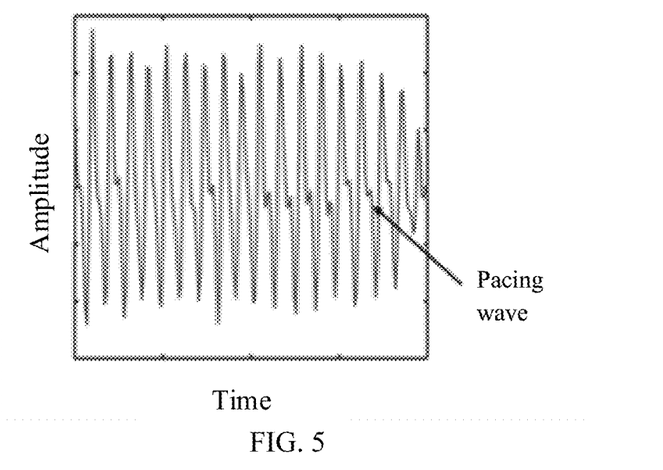
FIG. 5 shows a detection diagram of a heart rate pacing wave achieved by a fingerprint identification apparatus.

Principle of heart rate detection: when a user starts a heart rate detection function on an interface of a mobile phone and presses a finger on a fingerprint detection region, software controls a light source to emit a light signal (similar to a principle of fingerprint detection). A fingerprint identification apparatus may continuously capture a plurality of frames of fingerprint images at a fixed frame rate and calculate the average optical signal amount of each frame of fingerprint image. The optical signal amount of the continuous plurality of frames of fingerprint data in a period of time shows a strong heart rate PPG signal characteristic, and real-time heart rate information may be extracted through the PPG signal. FIG. 3 is a schematic diagram of an amplitude-time diagram of the conversion of a light signal of a finger into an electrical signal thereof. When light transmits through the skin tissue and then is reflected back to a fingerprint sensor, the light is attenuated to a certain extent. The absorption of light by muscles, bones, veins, and other connecting tissues is substantially unchanged, but the absorption of light by blood is different, and the absorption of light by blood naturally changes due to the flow of blood in arteries. FIG. 3 is a schematic diagram of an amplitude-time diagram of the conversion of a light signal of a finger into an electrical signal thereof. It can be seen from FIG. 3 that since the absorption of light by venous blood of a finger or deep tissue of a finger is substantively unchanged, the converted electrical signal is a direct current component, however, the absorption of light by arterial blood of a finger changes, the converted electrical signal is an alternating current component, the extracted alternating current component may reflect the characteristics of blood flow. Then, real-time heart rate information may be extracted from the optical signal amount of the continuous plurality of frames of fingerprint data in a certain time, which is the so-called heart rate detection. FIG. 4 shows an optical fingerprint extraction PPG signal diagram reflecting heart rate information. For a younger subject or a subject with a healthy arterial function, generally, a more detailed heart rate signal such as a pacing wave may also appear in the extracted heart rate signal, and the pacing wave indicates the closure of the aortic valve in medicine. FIG. 5 shows a detection diagram of a heart rate pacing wave achieved by a fingerprint identification apparatus.

Figure 6:
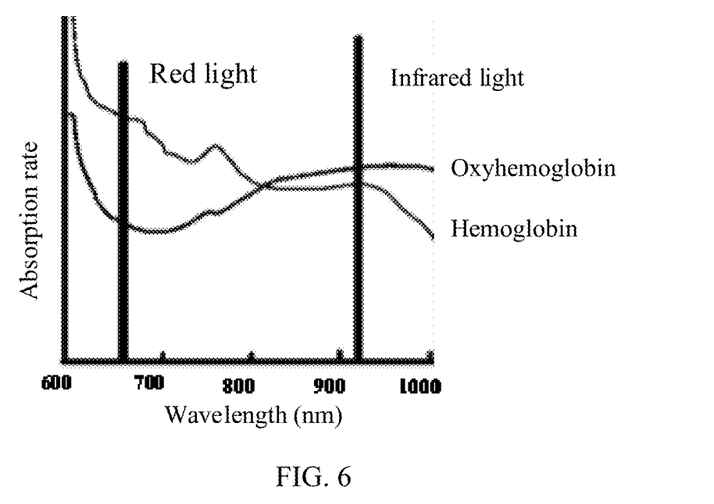
FIG. 6 shows a schematic diagram of an absorption rate of hemoglobin and oxyhemoglobin of a finger to light with different wavelengths.

Principle of blood oxygen detection: blood oxygen saturation is defined as a percentage of oxyhemoglobin in binding hemoglobin, and the hemoglobin concentration may be measured by using the difference of response of hemoglobin of the finger to light with different wavelengths. FIG. 6 shows a schematic diagram of an absorption rate of hemoglobin and oxyhemoglobin of a finger to light with different wavelengths. For example, a self-light-emitting red light source of a screen and an external infrared light source may be used to detect PPG signals of red light and infrared light of the finger simultaneously (the red light source and the infrared light source may be turned on alternately, when a red light spot is displayed on the screen, an infrared light-emitting diode (LED) is turned off, and when the infrared LED is turned on, the light spot on the screen is displayed in black), and the blood oxygen saturation may be calculated by the difference between PPG signals of red light and infrared light.

Figure 7:
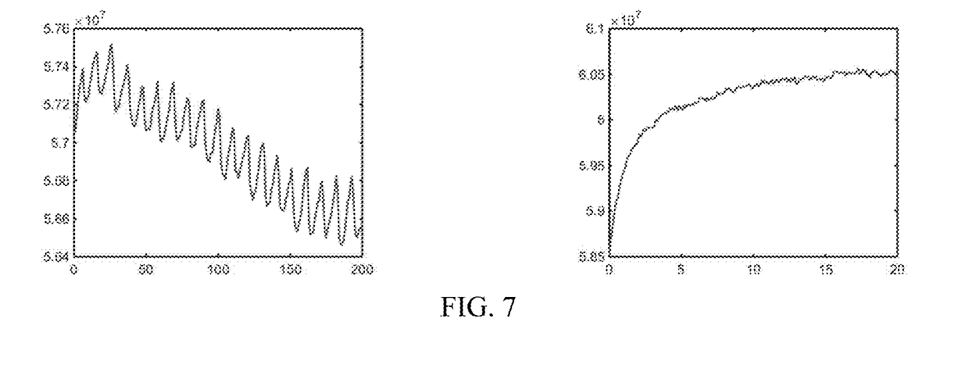
FIG. 7 shows schematic diagrams of heart rate signals of real and fake fingers.

Principle of living body detection: living body detection may be achieved by heart rate detection. For example, a heart rate signal may be extracted from a real finger, but not from a fake finger. The left diagram in FIG. 7 shows a schematic diagram of a heart rate signal of a real finger, and the right diagram in FIG. 7 shows a schematic diagram of a heart rate signal of a fake finger.

Specifically, in an embodiment of the present application, an image capturing mode may refer to various software settings in the entire process from light emission to data processing of a captured fingerprint image, and a fingerprint identification apparatus may use different image capturing modes (different software settings) to perform different function detection. For example, the fingerprint identification apparatus may merely capture one frame of fingerprint image to complete fingerprint identification, so the data amount that needs to be transmitted to the processor is relatively small, that is, the fingerprint identification apparatus does not need to process the captured fingerprint image but directly transmits it to the processor, which takes a relatively short time. For other function detection such as heart rate detection, the fingerprint identification apparatus usually needs to capture a plurality of frames of fingerprint images to extract a more accurate heart rate signal, so the data amount that needs to be transmitted to the processor is quite large, which takes a long time; and at this time, the captured fingerprint images for heart rate detection need to be compressed and then transmitted to the processor, and thus the transmission time can be reduced. For another example, for fingerprint identification, generally, in order to achieve a shorter exposure time length, brightness of light emitted by the screen needs to be increased; for other function detection, since the plurality of frames of fingerprint images need to be captured, the screen needs to emit light signals for a long time, however, high brightness in a long time may affect the life of the screen. Further, for other function detection, since the changes of light signals within a period of time may only need to be extracted and the demand for brightness is not so high, the brightness of light emitted by the screen may be appropriately reduced.

Therefore, in the method for biometric identification in the embodiment of the present application, different image capturing modes are used for different function detection, which is beneficial to improve detection performance.

Optionally, in an embodiment of the present application, the acquiring the plurality of frames of second fingerprint images by using the second image capturing mode includes: continuously capturing a plurality of frames of original fingerprint images; and compressing the plurality of frames of original fingerprint images to obtain the plurality of frames of second fingerprint images.

As analyzed above, when other function detection is performed, it is necessary to continuously capture a plurality of frames of fingerprint images, but if all pixel data of each frame of fingerprint image is transmitted, it will take a long time. For example, in general, a fingerprint image with a size of 6 mm and a resolution of 500 dpi (dots per inch) has a data size of several tens of K, which needs to be transmitted for 20-40 ms and takes a long time. In the embodiment of the present application, whether to compress the captured fingerprint image may be controlled by software. If fingerprint identification is performed, the captured fingerprint image may be directly transmitted without compression processing through software control; and if detection of other functions such as heart rate is performed, the captured fingerprint images may be compressed by software control and then transmitted. For example, each captured original fingerprint image may be divided into a plurality of sub-regions, and a plurality of pieces of pixel data of each sub-region may be separately processed into data with the number of pieces of data less than the number of pixel points. Optionally, summation processing or average processing may be performed on the pixel data in each sub-region. Alternatively, one piece of pixel data in each sub-region may be selected and the rest pixel data may be discarded, or the pixel data in each sub-region at the center position may be selected.

In an alternative embodiment, the fingerprint sensor may divide each captured frame of original fingerprint image into a plurality of sub-regions, and according to intensities of heart rate signals in each sub-region, data in a sub-region having a stronger signal is transmitted to the processor, that is, the fingerprint sensor discards data in the sub-region having a weaker signal.

In another alternative embodiment, the fingerprint sensor may also transmit all the continuously captured plurality of frames of original fingerprint images to the processor, and the processor may perform regional dividing processing on each frame of fingerprint image received. For example, the processor may divide each frame of fingerprint image into a plurality of sub-regions, and extract the heart rate signals of some sub-regions from them according to the intensities of heart rate signals in each sub-region. Specifically, the sub-region having a stronger heart rate signal may be selected for processing, and the sub-region having a weaker heart rate signal may be discarded. The intensities of heart rate signals at different positions are different due to the uneven distribution of blood vessels in the finger. By adopting a solution of the embodiment of the present application, the stronger portion of heart rate signal may be extracted, which is more conducive to the detection of the heart rate signal.

Optionally, a frame of original fingerprint image may be divided into 4 to 9 blocks. Taking a fingerprint image of 6*6 mm as an example, each sub-region may be a fingerprint region of 2*2 mm or 3*3 mm in size. The embodiment of the present application does not limit the size of sub-region.

Optionally, in an embodiment of the present application, a light signal emitted by the display screen is used to acquire the first fingerprint image and the plurality of frames of second fingerprint images, and the acquiring the first fingerprint image by using the first image capturing mode includes: acquiring the first fingerprint image in a first light-emitting mode of the display screen; and the acquiring the plurality of frames of second fingerprint images by using the second image capturing mode includes: acquiring the plurality of frames of second fingerprint images in a second light-emitting mode of the display screen, where an intensity of a light signal in the first light-emitting mode is greater than an intensity of a light signal in the second light-emitting mode.

When a fingerprint image is acquired by using a light signal from a display screen, a light-emitting mode of the display screen may be different under different function detection. For example, when fingerprint identification is performed, the light signal emitted by the display screen may be slightly stronger; when other function detection such as heart rate detection is performed, the light signal emitted by the display screen may be slightly weaker. The light-emitting mode of the display screen may be controlled by software according to a function to be performed by the fingerprint identification apparatus. When a certain function detection is performed, the display screen should be switched to the corresponding light-emitting mode. For example, when fingerprint identification is performed, a high brightness mode of the display screen may be turned on, and when other function detection is performed, a high brightness mode (HBM) of the display screen may be turned off; that is, the display screen is in a non-HBM mode.

For example, the brightness in a high brightness mode may be regarded to be higher than 450 nits (nit), while the brightness in a non-high brightness mode may be regarded to be lower than 450 nits. For another example, the brightness in the high brightness mode may be regarded to be higher than 1000 lux (lux), and the brightness in the non-high brightness mode may be regarded to be lower than 600 lux.

By controlling the light-emitting mode of the display screen, when fingerprint identification is performed, an exposure time length may be short, and when other function detection such as heart rate detection is performed, the influence of high brightness of the display screen in a long time on the display screen life can be reduced.

Optionally, in an embodiment of the present application, the acquiring the plurality of frames of second fingerprint images in the second light-emitting mode of the display screen includes: in the second light-emitting mode, acquiring the plurality of frames of second fingerprint images by using a target exposure time length, where the target exposure time length is greater than a preset exposure time length in the second light-emitting mode.

For intensities of different signals of a finger, heart rate signals of the finger are different in intensity. Therefore, when other function detection such as heart rate detection is performed, an exposure time length may be adjusted adaptively in the second light-emitting mode of the display screen, that is, the brightness of the light emitted by the display screen may be adjusted to some extent. For example, when the detected heart rate signal is insufficient, the exposure time length may be adaptively increased (but it necessarily be ensured that it is in the second light-emitting mode of the display screen), so that a better heart rate signal may be obtained.

Optionally, in an embodiment of the present application, the plurality of frames of second fingerprint images include a plurality of frames of third fingerprint images and a plurality of frames of fourth fingerprint images, and the acquiring the plurality of frames of second fingerprint images by using the second image capturing mode includes: acquiring the plurality of frames of third fingerprint images by using a light signal with a first wavelength; and acquiring the plurality of frames of fourth fingerprint images by using a light signal with a second wavelength, where difference between a light signal of the plurality of frames of third fingerprint images and a light signal of the plurality of frames of fourth fingerprint images is used for blood oxygen detection.

According to the principle of blood oxygen detection, fingerprint images generated by light signals of two different wavelengths need to be obtained to detect the blood oxygen saturation of the finger. Therefore, the acquired plurality of frames of second fingerprint images include a plurality of frames of third fingerprint images and a plurality of frames of fourth fingerprint images acquired by using two different wavelengths. Optionally, light with the two wavelengths may be respectively emitted by the display screen and the external light source, where a wavelength of light emitted by a certain light source may be the same as a wavelength of light emitted by the light source during fingerprint identification. For example, a light wave emitted by the display screen is a visible light wave, which may preferably be red, green, cyan, green gradient or cyan gradient, or the like. However, the light emitted by the external light source may be an infrared light wave. For example, a visible light wavelength may be 550 nm and an infrared light wavelength may be 940 nm.

Optionally, in an embodiment of the present application, when different function detection is performed, a sampling rate may also be controlled by software. For example, a sampling rate when fingerprint identification is performed may be smaller than a sampling rate when other function detection is performed. Preferably, when detection of other functions such as heart rate is performed, the sampling rate may be greater than or equal to 4 Hz, so that the measurement requirement of heart rate signal may be met. For example, when general heart rate detection is performed, the sampling rate only needs to be greater than 4 Hz; and when it is desirable to extract a more detailed heart rate signal (such as a pacing wave), the sampling rate may be set to be greater than 10 Hz.

The flow of heart rate detection, blood oxygen detection, and living body detection according to embodiments of the present application will be described with reference to FIGS. 8 to 10.

Figure 8:
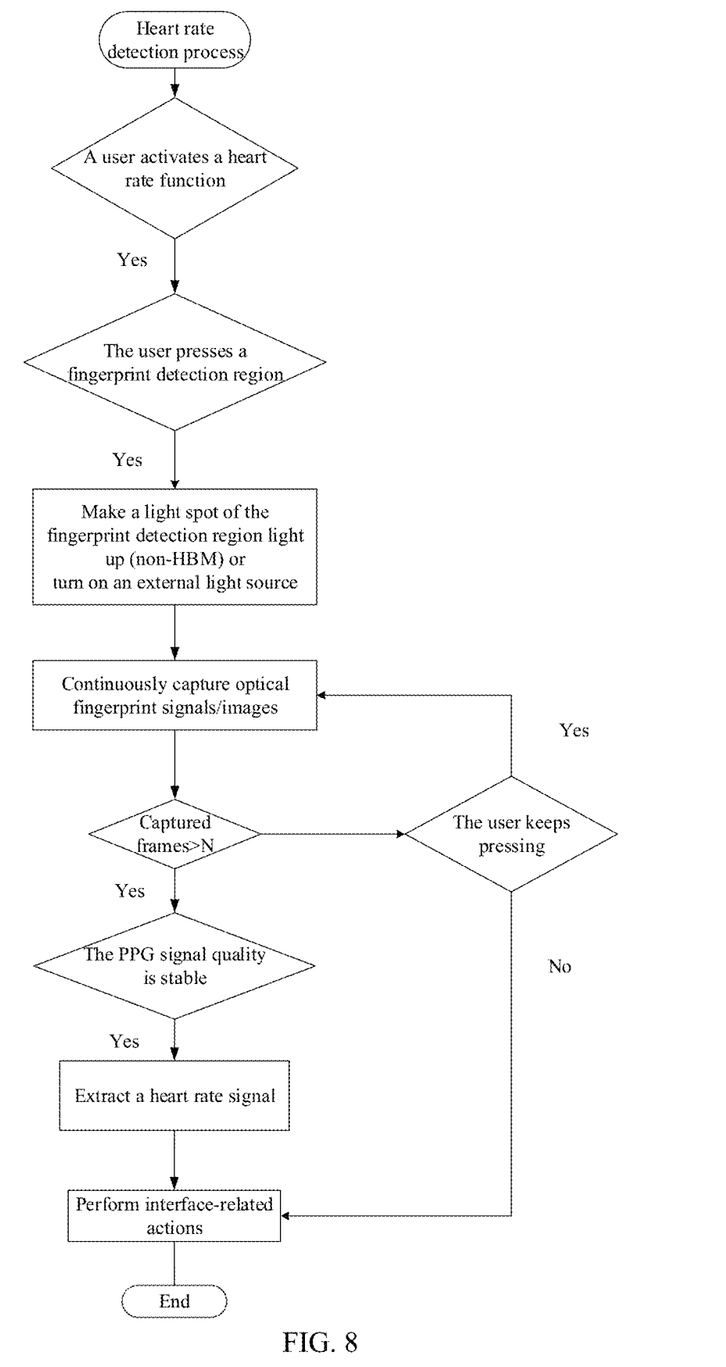
FIG. 8 to FIG. 10 show flowcharts of heart rate detection, blood oxygen detection and living body detection according to embodiments of the present application.

As shown in FIG. 8, a heart rate detection process may include some or all of the following contents.

After a user selects to activate a heart rate detection function, the user presses a fingerprint detection region of a fingerprint identification apparatus. When the fingerprint identification apparatus detects that the finger is pressed against the fingerprint detection region, software controls a display screen to make a light spot of the fingerprint detection region light up (and make the display screen in a non-HBM mode) or turn on an external light source. A fingerprint sensor continuously captures optical fingerprint signals/images, and when it is determined that the number of captured frames reaches a predetermined number of frames (for example, greater than N), it may be further determined whether the PPG signal quality is stable; and if it is determined that the number of captured frames does not reach a predetermined number of frames, the user keeps pressing, and the fingerprint sensor continues to capture the optical fingerprint signal/image. When the PPG signal quality is stable, a heart rate signal may be extracted, and then an electronic device may be controlled to display relevant contents (for example, prompting the user that the measurement is completed, displaying the heart rate measurement results on the interface or displaying the heart rate curve in the measurement process, or the like).

Figure 9:
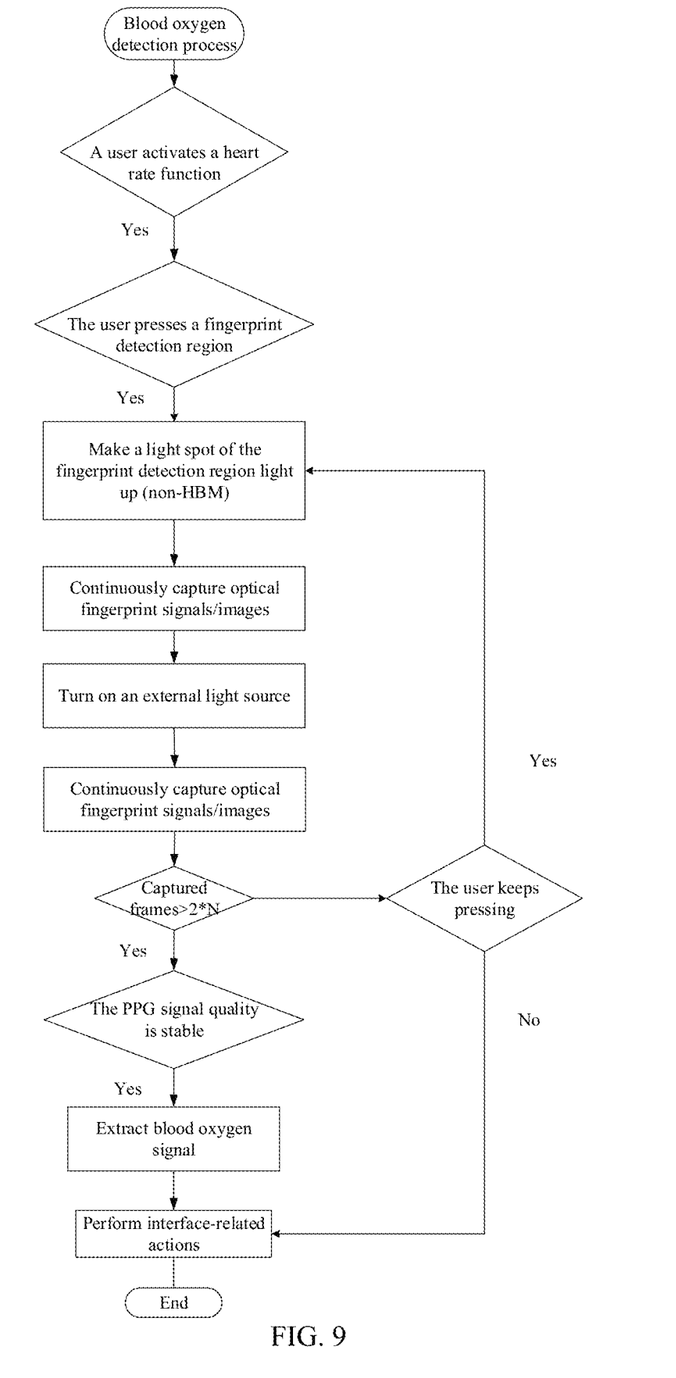

As shown in FIG. 9, a blood oxygen detection process may include some or all of the following contents.

After a user selects to activate a blood oxygen detection function, the user presses a fingerprint detection region of a fingerprint identification apparatus. When the fingerprint identification apparatus detects that the finger is pressed against the fingerprint detection region, software controls a display screen to make a light spot of the fingerprint detection region light up (and make the display screen in a non-HBM mode), and a fingerprint sensor continuously captures optical fingerprint signals/images. Further, the software controls the display screen to make the light spot dark and turn on an external light source, and the fingerprint sensor continuously captures the optical fingerprint signals/images. When it is determined that the number of captured frames reaches a predetermined number of frames (for example, greater than 2N), it may be further determined whether the PPG signal quality is stable; and if it is determined that the number of captured frames does not reach a predetermined number of frames, the user keeps pressing, and the fingerprint sensor continues to capture the optical fingerprint signal/image. When the PPG signal quality is stable, a blood oxygen signal may be extracted, and then an electronic device may be controlled to display relevant contents (for example, prompting the user that the measurement is completed, displaying the blood oxygen measurement results on the interface or displaying the blood oxygen curve in the measurement process, or the like).

Figure 10:
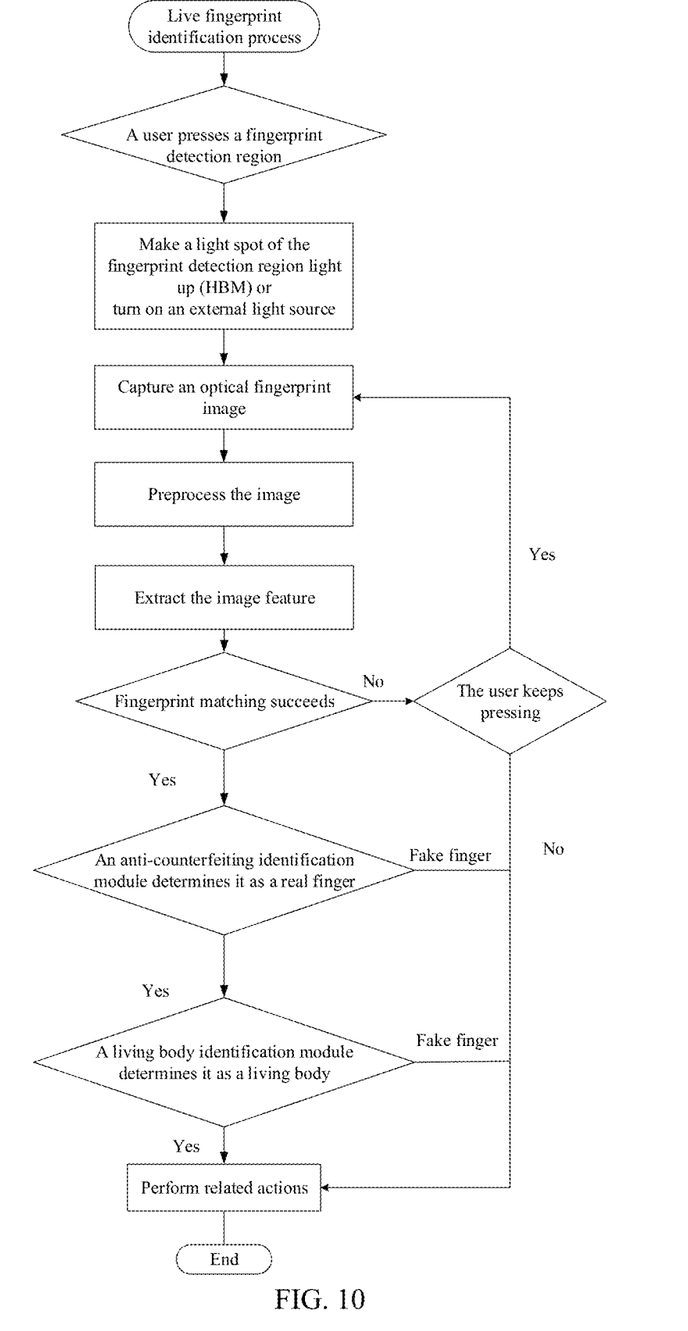

As shown in FIG. 10, living body detection may include some or all of the following contents.

After a user presses a fingerprint detection region of a fingerprint identification apparatus, software controls a display screen to make a light spot of the fingerprint detection region light up (and make the display screen in an HBM mode) or turn on an external light source. A fingerprint sensor captures an optical fingerprint image, preprocesses the fingerprint image, further extracts the image feature, and then performs fingerprint matching. If the matching is successful, the acquired fingerprint image is input into an anti-counterfeiting identification module to determine whether the finger is a 3D finger; if yes, the fingerprint image is further input into a living body identification module to determine whether the finger is a living body; and if one of the anti-counterfeiting identification module and the living body identification module determines that the finger is a fake finger, the user needs to keep pressing, and the fingerprint sensor continues to capture the optical fingerprint image. After determining that the finger is a living body, the interface may be controlled to display relevant contents (for example, prompting such as unlocking success/failure, payment completion/failure, turning off the light source/restoring the display interface, or the like).

It should be noted that one of the anti-counterfeiting identification module and the living body identification module may be selected. In some application scenarios with a lower security level, only the anti-counterfeiting identification module may be selected; however, in some application scenarios with a high security level, only the living body identification module or both modules may be selected.

It should be understood that normal fingerprint identification may also be performed after the living body determination is passed.

Optionally, when the living body detection is performed, the finger may be pressed for 1 to 5 s, that is, the living body may be determined through the heart rate signals generated in 1 to 5 s.

It should also be understood that in addition to being applicable to the under-screen fingerprint identification apparatus, the foregoing various embodiments may also be applied to the fingerprint identification apparatus with a transparent back cover, the light-emitting light source may be disposed under the transparent back cover, and the blood oxygen detection may be achieved by setting light sources having different wavelengths.

It should be understood that sequence numbers of the foregoing processes do not mean execution sequences. The execution sequences of the processes should be determined according to functions and internal logic of the processes, and should not be construed as any limitation on the implementation processes of the embodiments of the present application.

Although the present application and advantages of the present application have been described in detail, it should be understood that the present application may be changed, substituted, and modified without departing from the spirit and scope of the present application as defined in the appended claims.

Figure 11:
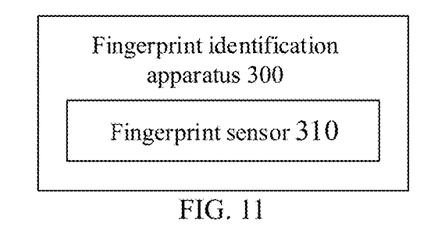
FIG. 11 shows a schematic block diagram of a fingerprint identification apparatus according to an embodiment of the present application.

FIG. 11 illustrates a schematic block diagram of a fingerprint identification apparatus 300 of an embodiment of the present application. The apparatus 300 is applied to an electronic device with a fingerprint identification function. The apparatus 300 is disposed under the display screen. As shown in FIG. 11, the apparatus includes the following contents:

a fingerprint sensor 310 configured to acquire a first fingerprint image by using a first image capturing mode, where the first fingerprint image is used for first biometric identification, and the first biometric identification includes fingerprint identification;

the fingerprint sensor 310 further configured to acquire a plurality of frames of second fingerprint images by using a second image capturing mode, where the plurality of frames of second fingerprint images are used for second biometric identification, and the second biometric identification includes at least one of heart rate detection, blood oxygen detection or living body detection, and the first image capturing mode is different from the second image capturing mode.

Figure 12:
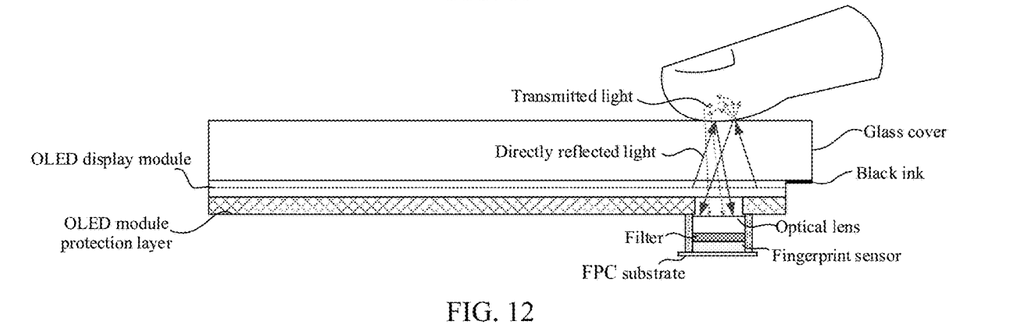
FIG. 12 to FIG. 14 show schematic diagrams of three fingerprint identification apparatuses for biometric identification applicable to embodiments of the present application.
Figure 13:
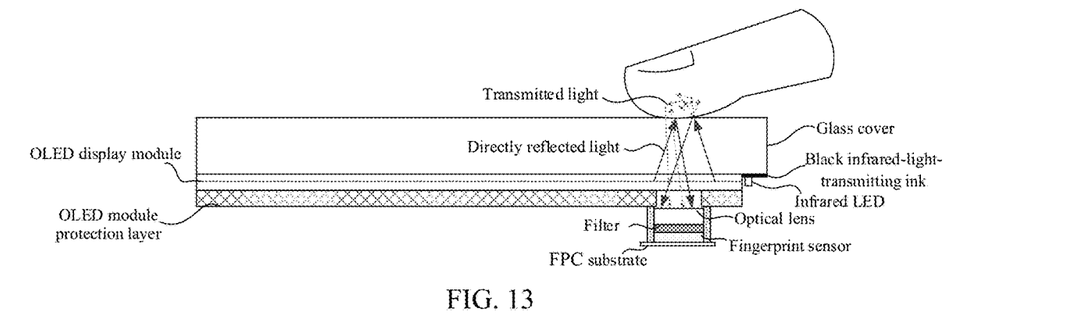
Figure 14:
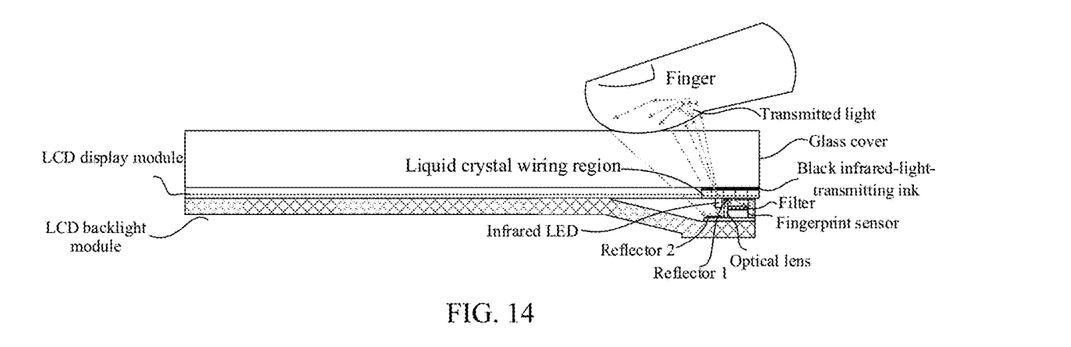

FIG. 12 to FIG. 14 show schematic diagrams of three fingerprint identification apparatuses for biometric identification.

As shown in FIG. 12, a glass cover is provided above an OLED display module, and an OLED module protection layer is provided under the OLED display module, and the OLED module protection layer is provided with a light transmission window, and an optical lens, a filter, and a fingerprint sensor are sequentially provided from top to bottom to form a fingerprint identification apparatus, and the fingerprint sensor is fixed on a flexible printed circuit (FPC) substrate, the fingerprint identification apparatus is fixedly connected to a lower portion of the OLED module protection layer and is disposed right under the light transmission window, so that light emitted by the OLED display module and reflected and transmitted by a finger may be incident on the fingerprint sensor, and black ink may be provided under the glass cover that is not covered by the OLED display module. In addition to the normal fingerprint identification function, the fingerprint identification apparatus in FIG. 12 may also perform function detection such as heart rate detection and living body detection.

As shown in FIG. 13, a glass cover is provided above an OLED display module, and an OLED module protection layer is provided under the OLED display module, and the OLED module protection layer is provided with a light transmission window, and an optical lens, a filter, and a fingerprint sensor are sequentially provided from top to bottom to form a fingerprint identification apparatus, and the fingerprint sensor is fixed on a flexible printed circuit (FPC) substrate, the fingerprint identification apparatus is fixedly connected to a lower portion of the OLED module protection layer and is disposed right under the light transmission window, so that light emitted by the OLED display module and reflected and transmitted by a finger may be incident on the fingerprint sensor, and black infrared-light-transmitting ink may be disposed under the glass cover that is not covered by the OLED display module, and an external infrared LED light source is disposed under the black infrared-light-transmitting ink. In addition to the normal fingerprint identification function, the fingerprint identification apparatus in FIG. 13 may also perform function detection such as heart rate detection, blood oxygen detection, or living body detection.

As shown in FIG. 14, a glass cover is disposed above a liquid crystal display module of a liquid crystal display (LCD) screen, an LCD backlight module is disposed under the LCD module, and a fingerprint identification apparatus composed of a filter, an optical lens, a reflector 1, a reflector 2, a fingerprint sensor and an external infrared LED light source is disposed between the LCD module and the LCD backlight module. Light emitted by the external infrared LED light source and reflected and transmitted by the finger may be incident on the fingerprint sensor, and black infrared-light-transmitting ink is provided between the LCD module and the glass cover. Since the LCD module cannot emit light by itself and the backlight module cannot transmit light, it is necessary to add the external infrared LED light source under the glass cover, to use the infrared light source to achieve function detection such as living fingerprint detection or heart rate detection. The filter transmits infrared light in a narrow band, which may only allow light with a wavelength near an infrared band to transmit through, preferably, the wavelength is 850±30 nm or 940±30 nm, so as to prevent the interference of white light of backlight module or visible light in external environment. The black ink between the glass cover and the LCD module needs to be changed into infrared light-transmitting ink, and the wavelength of infrared LED may be 760 nm to 1000 nm, preferably, one or both of 850/940 nm are selected.

Optionally, in an embodiment of the present application, the fingerprint sensor is configured to continuously capture a plurality of frames of original fingerprint images; and compress the plurality of frames of original fingerprint images to obtain the plurality of frames of second fingerprint images.

Optionally, in an embodiment of the present application, the fingerprint sensor is configured to: divide each frame of fingerprint image in the plurality of frames of original fingerprint images into a plurality of sub-regions; and process a plurality pieces of pixel data included in each sub-region of the plurality of sub-regions into one piece of data to obtain the plurality of frames of second fingerprint images.

Optionally, in an embodiment of the present application, the fingerprint sensor is configured to: perform summation processing or average processing on the plurality pieces of pixel data included in each sub-region.

Optionally, in an embodiment of the present application, a light signal emitted by the display screen is used to acquire the first fingerprint image and the plurality of frames of second fingerprint images, and the fingerprint sensor is configured to: acquire the first fingerprint image in a first light-emitting mode of the display screen; and acquire the plurality of frames of second fingerprint images in a second light-emitting mode of the display screen, where an intensity of a light signal in the first light-emitting mode is greater than an intensity of a light signal in the second light-emitting mode.

Optionally, in an embodiment of the present application, the first light-emitting mode is a high brightness mode (HBM), and the second light-emitting mode is a non-HBM.

Optionally, in an embodiment of the present application, the fingerprint sensor is configured to: in the second light-emitting mode, acquire the plurality of frames of second fingerprint images by using a target exposure time length, where the target exposure time length is greater than a preset exposure time length in the second light-emitting mode.

Optionally, in an embodiment of the present application, the plurality of frames of second fingerprint images include a plurality of frames of third fingerprint images and a plurality of frames of fourth fingerprint images, the display screen is configured to emit a light signal with a first wavelength, and the fingerprint identification apparatus further includes: an external light source configured to emit a light signal with a second wavelength, where the first wavelength is different from the second wavelength; the fingerprint sensor is configured to: acquire the plurality of frames of third fingerprint images by using the light signal with the first wavelength; and acquire the plurality of frames of fourth fingerprint images by using the light signal with the second wavelength, where difference between a light signal of the plurality of frames of third fingerprint images and a light signal of the plurality of frames of fourth fingerprint images is used for blood oxygen detection, and the first wavelength and the second wavelength are different.

Optionally, in an embodiment of the present application, the first wavelength is a visible light wavelength, and the second wavelength is an infrared light wavelength.

Optionally, in an embodiment of the present application, the fingerprint sensor is configured to: acquire the first fingerprint image by using a first sampling rate; and acquire the plurality of frames of second fingerprint images by using a second sampling rate, where the second sampling rate is greater than the first sampling rate.

Optionally, in an embodiment of the present application, the second sampling rate is greater than or equal to 4 Hz.

The fingerprint identification apparatus provided in FIG. 11 to FIG. 14 may correspond to the execution body in the method embodiment of the present application, and the foregoing and other operations and/or functions of each unit in the fingerprint identification apparatus are respectively for achieving the corresponding process of the method in FIG. 2, which will not be repeatedly described herein for brevity.

Optionally, according to an embodiment of the present application, an electronic device is also provided, and the terminal device may include the fingerprint identification apparatus and the display screen in the foregoing various embodiments, and the fingerprint identification apparatus is disposed under the display screen.

Optionally, the electronic device includes an external light source and/or the display screen emits light by itself.

Optionally, a wavelength of a light signal emitted by the display screen is different from a wavelength of a light signal emitted by the external light source.

Optionally, the terminal device includes, but is not limited to, a mobile phone, a tablet, a computer, a multimedia player, and a game console.

It should be understood that "one embodiment" or "an embodiment" mentioned throughout the specification means that particular features, structures, or characteristics in connection with the embodiment are included in at least one embodiment of the present application. Therefore, "in one embodiment" or "in an embodiment" appeared throughout the specification does not necessarily mean a same embodiment. Further, the particular features, structures or characteristics may be combined in any suitable manner in one or more embodiments.

Those of ordinary skill in the art may be aware that, units and circuits of the examples described in the embodiments disclosed in this description may be implemented by electronic hardware, computer software, or a combination of the two. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the present application.

It should be understood that, in the several embodiments provided in the present application, the disclosed circuits, branches, and units may be implemented in other manners. For example, the above-described branches are merely exemplary. For example, dividing of the units is merely a type of logical function dividing, and there may be other dividing manners during actual implementation. For example, multiple units or components may be combined or integrated into a branch, or some features may be ignored, or may not be executed.

If being implemented in the form of a software functional unit and sold or used as a separate product, the integrated unit may be stored in a computer-readable storage medium. Based on such understanding, the nature of the technical solutions of the present application, or the part contributing to the prior art, or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present application, however, the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A method for biometric identification, wherein the method is applied to a fingerprint identification apparatus, the fingerprint identification apparatus is disposed under a display screen, and the method comprises:
    acquiring a first fingerprint image by using a first image capturing mode, wherein the first fingerprint image is used for first biometric identification, and the first biometric identification comprises fingerprint identification; and
    acquiring a plurality of frames of second fingerprint images by using a second image capturing mode, wherein the plurality of frames of second fingerprint images are used for second biometric identification, and the second biometric identification comprises at least one of heart rate detection, blood oxygen detection or living body detection, and the first image capturing mode is different from the second image capturing mode;
    wherein a light signal emitted by the display screen is used to acquire the first fingerprint image and the plurality of frames of second fingerprint images, and the acquiring the first fingerprint image by using the first image capturing mode comprises:
        acquiring the first fingerprint image in a first light-emitting mode of the display screen; and
    the acquiring the plurality of frames of second fingerprint images by using the second image capturing mode comprises:
        acquiring the plurality of frames of second fingerprint images in a second light-emitting mode of the display screen, wherein an intensity of a light signal in the first light-emitting mode is greater than an intensity of a light signal in the second light-emitting mode.

2. The method according to claim 1, wherein the acquiring the plurality of frames of second fingerprint images by using the second image capturing mode comprises:
    continuously capturing a plurality of frames of original fingerprint images; and
    compressing the plurality of frames of original fingerprint images to obtain the plurality of frames of second fingerprint images.

3. The method according to claim 2, wherein the compressing the plurality of frames of original fingerprint images to obtain the plurality of frames of second fingerprint images comprises:
    dividing each frame of fingerprint image in the plurality of frames of original fingerprint images into a plurality of sub-regions; and
    processing a plurality pieces of pixel data included in each sub-region of the plurality of sub-regions into one piece of data to obtain the plurality of frames of second fingerprint images.

4. The method according to claim 3, wherein the processing the plurality pieces of pixel data included in each sub-region of the plurality of sub-regions into one piece of data comprises:
    performing summation processing or average processing on the plurality pieces of pixel data included in each sub-region.

5. The method according to claim 1, wherein the first light-emitting mode is a high brightness mode (HBM), and the second light-emitting mode is a non-HBM.

6. The method according to claim 1, wherein the acquiring the plurality of frames of second fingerprint images in the second light-emitting mode of the display screen comprises:
    in the second light-emitting mode, acquiring the plurality of frames of second fingerprint images by using a target exposure time length, wherein the target exposure time length is greater than a preset exposure time length in the second light-emitting mode.

7. The method according to claim 1, wherein the plurality of frames of second fingerprint images comprise a plurality of frames of third fingerprint images and a plurality of frames of fourth fingerprint images, and the acquiring the plurality of frames of second fingerprint images by using the second image capturing mode comprises:
    acquiring the plurality of frames of third fingerprint images by using a light signal with a first wavelength; and
    acquiring the plurality of frames of fourth fingerprint images by using a light signal with a second wavelength, wherein difference between a light signal of the plurality of frames of third fingerprint images and a light signal of the plurality of frames of fourth fingerprint images is used for blood oxygen detection, and the first wavelength is different from the second wavelength.

8. The method according to claim 7, wherein the first wavelength is a visible light wavelength, and the second wavelength is an infrared light wavelength.

9. The method according to claim 1, wherein the acquiring the first fingerprint image by using the first image capturing mode comprises:
acquiring the first fingerprint image by using a first sampling rate; and
the acquiring the plurality of frames of second fingerprint images by using the second image capturing mode comprises:
acquiring the plurality of frames of second fingerprint images by using a second sampling rate, wherein the second sampling rate is greater than the first sampling rate.

10. The method according to claim 9, wherein the second sampling rate is greater than or equal to 4 Hz.

11. A fingerprint identification apparatus, wherein the fingerprint identification apparatus is disposed under a display screen, and the fingerprint identification apparatus comprises:
a fingerprint sensor configured to acquire a first fingerprint image by using a first image capturing mode, wherein the first fingerprint image is used for first biometric identification, and the first biometric identification comprises fingerprint identification;
wherein the fingerprint sensor is further configured to:
acquire a plurality of frames of second fingerprint images by using a second image capturing mode, wherein the plurality of frames of second fingerprint images are used for second biometric identification, and the second biometric identification comprises at least one of heart rate detection, blood oxygen detection or living body detection, and the first image capturing mode is different from the second image capturing mode;
wherein a light signal emitted by the display screen is used to acquire the first fingerprint image and the plurality of frames of second fingerprint images, and the fingerprint sensor is configured to:
acquire the first fingerprint image in a first light-emitting mode of the display screen; and
acquire the plurality of frames of second fingerprint images in a second light-emitting mode of the display screen, wherein an intensity of a light signal in the first light-emitting mode is greater than an intensity of a light signal in the second light-emitting mode.

12. The fingerprint identification apparatus according to claim 11, wherein the fingerprint sensor is configured to:
continuously capture a plurality of frames of original fingerprint images; and
compress the plurality of frames of original fingerprint images to obtain the plurality of frames of second fingerprint images.

13. The fingerprint identification apparatus according to claim 12, wherein the fingerprint sensor is configured to:
divide each frame of fingerprint image in the plurality of frames of original fingerprint images into a plurality of sub-regions; and
process a plurality pieces of pixel data included in each sub-region of the plurality of sub-regions into one piece of data to obtain the plurality of frames of second fingerprint images.

14. The fingerprint identification apparatus according to claim 13, wherein the fingerprint sensor is configured to:
perform summation processing or average processing on the plurality pieces of pixel data included in each sub-region.

15. The fingerprint identification apparatus according to claim 11, wherein the first light-emitting mode is a high brightness mode (HBM), and the second light-emitting mode is a non-HBM.

16. The fingerprint identification apparatus according to claim 11, wherein the fingerprint sensor is configured to:
in the second light-emitting mode, acquire the plurality of frames of second fingerprint images by using a target exposure time length, wherein the target exposure time length is greater than a preset exposure time length in the second light-emitting mode.

17. The fingerprint identification apparatus according to claim 11, wherein the plurality of frames of second fingerprint images comprise a plurality of frames of third fingerprint images and a plurality of frames of fourth fingerprint images, the display screen is configured to emit a light signal with a first wavelength, and the fingerprint identification apparatus further comprises:
an external light source configured to emit a light signal with a second wavelength, wherein the first wavelength is different from the second wavelength; and
the fingerprint sensor is configured to:
acquire the plurality of frames of third fingerprint images by using the light signal with the first wavelength; and
acquire the plurality of frames of fourth fingerprint images by using the light signal with the second wavelength, wherein difference between a light signal of the plurality of frames of third fingerprint images and a light signal of the plurality of frames of fourth fingerprint images is used for blood oxygen detection.

18. The fingerprint identification apparatus according to claim 11, wherein the fingerprint sensor is configured to:
acquire the first fingerprint image by using a first sampling rate; and
acquire the plurality of frames of second fingerprint images by using a second sampling rate, wherein the second sampling rate is greater than the first sampling rate.

* * * * *